(12) United States Patent
Deliwala

(10) Patent No.: US 7,194,156 B2
(45) Date of Patent: Mar. 20, 2007

(54) HIGH BIT RATE OPTICAL COMMUNICATION OVER MULTIMODE FIBERS

(75) Inventor: Shrenik Deliwala, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 11/056,890

(22) Filed: Feb. 11, 2005

(65) Prior Publication Data

US 2006/0182388 A1     Aug. 17, 2006

(51) Int. Cl.
  *G02B 6/26*     (2006.01)
(52) U.S. Cl. ................ 385/29; 385/15; 385/27; 385/28; 385/43
(58) Field of Classification Search ............ 385/15, 385/27–29
  See application file for complete search history.

(56) References Cited

U.S. PATENT DOCUMENTS

| 5,416,862 A | | 5/1995 | Haas et al. | |
| 6,008,675 A | * | 12/1999 | Handa | 327/96 |
| 6,377,726 B1 | * | 4/2002 | Danziger et al. | 385/28 |

FOREIGN PATENT DOCUMENTS

| EP | 1041409 | 10/2000 |
| EP | 1460785 | 9/2004 |

OTHER PUBLICATIONS

"Modal Noise in Multimode Fibers Under Restricted Launch Conditions," Papen et al., *J. of Lightwave Technology*, vol. 17, n. 5 (May 1999).
"Reduction of Modal Noise by Using Reduced Spot Excitation," Saijonmaa et al., *Applied Optics*, vol. 20, n. 24 (Dec. 15, 1981).
"An Experimental and Theoretical Study of the Offset Launch Technique for the Enhancement of the Bandwidth of Multimode Fiber Links," Raddatz et al., *J. of Lightwave Technology*, vol. 16, n. 3 (Mar. 1998).
"Enhanced Multimode Fiber Link Performance Using a Spatialy Resolved Receiver," Patel et al., *IEEE Photonics Technology Letters*, vol. 14, n. 3 (Mar. 2002).
"Exploiting Diversity in Multimode Fiber Communications Links Via Multisegment Detectors and Equalization," Argon et al., *IEEE Communications Letters*, vol. 7, n. 8 (Aug. 2003).
"Light Coupling by a Vortex Lens into Graded Index Fiber," Johnson et al., *J. of Lightwave Technology*, vol. 19, n. 5 (May 2001).
"Selective Excitation of Parabolic-Index Optical Fibers by Gaussian Beams," Saijonmaa et al., *Applied Optics*, vol. 19, n. 14 (Jul. 15, 1980).

(Continued)

*Primary Examiner*—Jennifer Doan
(74) *Attorney, Agent, or Firm*—Gauthier & Connors LLP

(57) ABSTRACT

An optical communication system includes a transmitter that receives an input optical signal from an optical source and performs filtering so that an output signal from the transmitter includes a specific set of fiber modes that are allowed to pass for further processing. A receiver receives the output signal and performs the necessary operations to retrieve a signal indicative of the input signal.

12 Claims, 9 Drawing Sheets

OTHER PUBLICATIONS

"A Mode-Filtering Scheme for Improvement of the Bandwidth-Distance Product in Multimode Fiber Systems," Haas et al., *J. of Lightwave Technology*, vol. 11, n. 7 (Jul. 1997).

"Dispersive Multiplexing in Multimode Fiber," H.R. Stuart,(*Th V2-1/305*, ThV2-2/306 and ThV2-3/307).

"Differential Mode Loss and Mode Conversion in Passive Fiber Components Measured Using the Chromatic Launching and the Central Spot Far Field Techniques," Severin et al., *J. of Lightwave Technology* vol. Lt-4, n. 11 (Nov. 1986).

"A Statistical Analysis of Conditioned Launch for Gigabit Ethernet Links Using Multimode Fiber," Webster et al., *J. of Lightwave Technology*, vol. 17, n. 9 (Sep. 1999).

* cited by examiner

Real part of electric field profiles
of LP modes of a step index fiber

Transmitter design 2

Receiver design 4

US 7,194,156 B2

HIGH BIT RATE OPTICAL COMMUNICATION OVER MULTIMODE FIBERS

BACKGROUND OF THE INVENTION

The invention relates to the field of optical communication, and in particular to high bit-rate optical communication over multimode fibers.

Multimode fibers are commonly used in the optical communication industry. Most multimode fibers used in the communication systems have core diameters of 50 μm or 62.5 μm. Some plastic fibers may have larger core diameters. These fibers may have step-index or radially varying graded-index profiles. Typical bandwidth-distance product (BDP) for these fibers in which all modes are excited is in the range of 200–2000 MHz.km with the newer graded index fibers occupying the higher end of the BDP range. These fibers were originally deployed for $\leq 1.25$ Gbps communication channels.

Many approaches are being pursued to achieve higher BDP with an old or a new MM fiber. The most promising approach involves launching laser light such that only a subset of the modes of the fiber are excited. Carefully chosen subsets of modes have smaller modal dispersion than the conventional BDP of the fiber which is often calculated assuming that the laser had excited all the modes. This effectively increases BDP and is shown in the laboratory to increase the effective bandwidth (EB) of the MM fiber so that one can meet the data transport needs.

One of the most popular of these Restricted Mode Launch (RML) schemes is to launch from a SM fiber with a 6–10 μm mode diameter into the MM fiber with an offset of 10–15 μm from the center. This has been seen as the most robust means of exciting the subset of modes for a wide variety of fiber types. The received signal is collected in its entirety on a detector. Even with the RML, there is sufficient modal dispersion of the excited modes so as to limit the data communication rates to below the needs of the user. Thus, as the data rate is increased, one can see "eye closure" or that the impulse response of the fiber channel is spread over multiple unit intervals of data rate. For example, a 62.5 micron core fiber with index perturbed from an ideal square law index profile may not support 10 Gbps over a distance of 500 m. This makes the direct recovery of the signal difficult or impossible with low BER. Thus, the received signal is then electronically processed to recover the original signal with low BER. The methods for "cleaning up" may use combination of error correcting codes (ECC) and signal processing to provide electronic modal dispersion compensation.

Most of the reported effort to increase the EB has been spent on exciting a subset of modes. Much work in this area has resulted in identification of a group of modes that have acceptable BDP for high speed transport. Ideally, one needs to pick a robust group with characteristics such as (i) the modes from this group propagate along the fiber with little excitation of the modes from the other groups, (ii) completely mixed within the group so that the details of the excitation is averaged out producing reliable output on the receiver, and (iii) works with most installed fiber types. It has proven difficult to satisfy all of the above so that a simple and universal electronic dispersion compensator can be designed. At present, offset mode launch together with an EDC is considered a possible solution.

There is a need for using these legacy fibers to transport higher bandwidth signals in the range of 4–10 Gbps for a distance of at least 300 m. Thus, one needs a BDP of 900–2100 MHz.km. These fibers can be preferred over single mode fibers because of ease of coupling, familiarity, and new installations.

SUMMARY OF THE INVENTION

According to one aspect of the invention, there is provided an optical communication system. The optical communication system includes a transmitter that receives an input optical signal from an optical source and performs filtering so that an output signal from the transmitter includes a specific set of fiber modes that are allowed to pass for further processing. A receiver receives the output signal and performs the necessary operations to retrieve a signal indicative of the input signal.

According to another aspect of the invention, there is provided a method of configuring an optical communication system. The method includes providing a transmitter that receives an input optical signal from an optical source and performs filtering so that an output signal from the transmitter includes a specific set of fiber modes that are allowed to pass for further processing. Also, the method includes providing a receiver that receives the output signal and performs the necessary operations to retrieve a signal indicative of the input signal.

According to another aspect of the invention, there is provided a method of performing optical communications. The method includes receiving an input optical signal from an optical source and performing filtering so that an output signal from the transmitter includes a specific set of fiber modes that are allowed to pass for further processing. Also, the method includes receiving the output signal and performing the necessary operations to retrieve a signal indicative of the input signal.

DETAILED DESCRIPTION OF THE INVENTION

Figure 1:
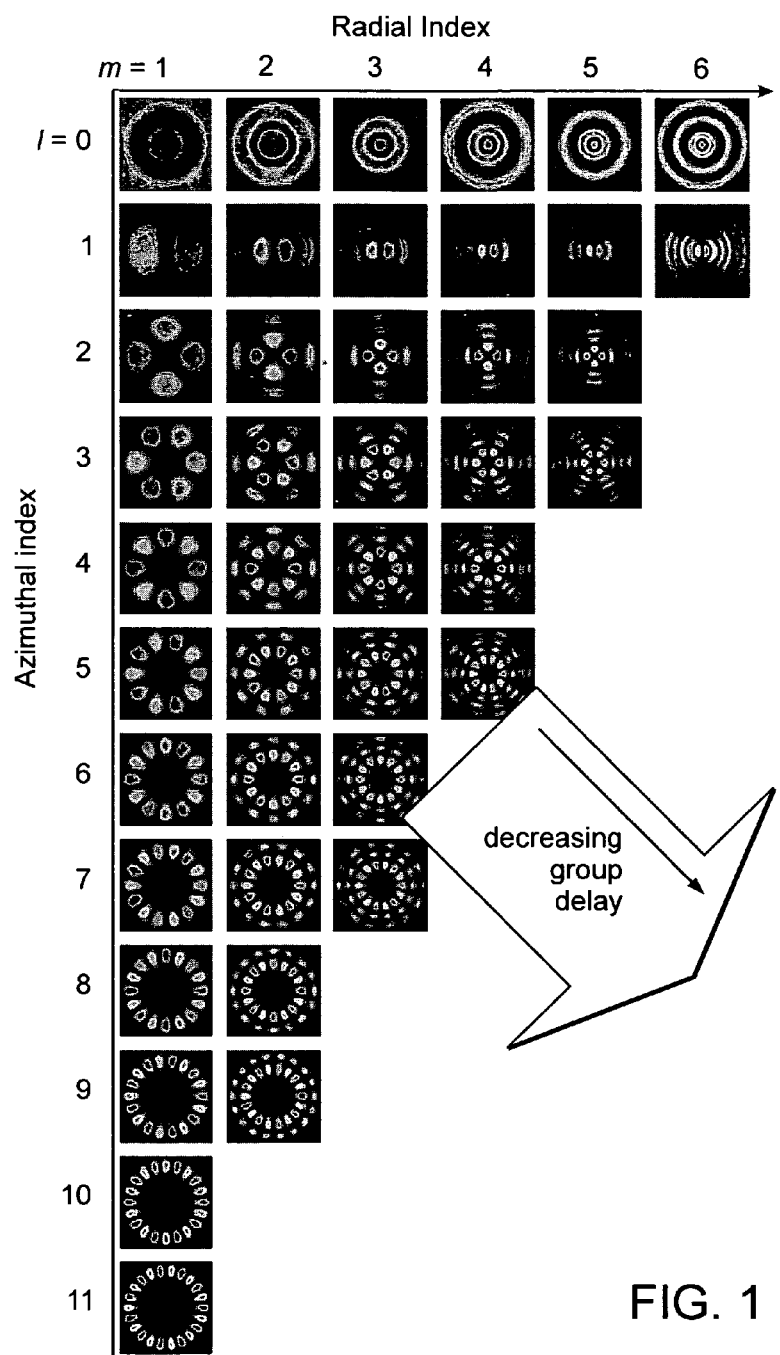
FIG. 1 is a graph demonstrating the excitation of various modes used in accordance with the invention.

The invention attempts to increase the EB of a MM fiber by simultaneously using (i) a special form of restricted mode launch from the transmitter and (ii) an optical filter at the output that passes only a specific set of fiber modes and filters out the unwanted modes before the optical signal is detected by a photodiode. The optical filter at the output is an example of a complex linear filter such that any linear combination of the modes of the fiber may be selected at the transmitter for excitation and at the receiver for filtering before detection.

The simplest method to implement the concept outlined above would be to excite only a fundamental mode of the fiber which is traditionally designated as $LP_{01}$. This is a linearly polarized mode and can be predominantly excited in the fiber with an appropriately matched Gaussian beam. A Gaussian beam will be used having the definition of waist w as $$E_G(r) = e^{-(\frac{r}{w})^2}.\qquad\text{Eq. 1}$$

The waist w can be chosen by the choice of lens and other matching optics to primarily excite the fundamental mode of the fiber. For example, for a step-index fiber w can be chosen to couple over 90% of the light to the fundamental mode of an MM fiber. An imaging optic can simply scale the fundamental mode of a SM fiber (which is also $LP_{01}$) to the fundamental mode of the MM fiber. Misalignments in both position and angle would cause excitation of the (unwanted) higher order modes. Also, scattering, bends, and other imperfections along the length of the fiber would cause transfer of signal form the signal mode (chosen to be $LP_{01}$ for this example) to other interfering modes. One may write the complex impulse response of the fiber system as $$h(r, t) = \sum_{lm=allmodes} \eta_{lm} \exp\!\left(-\frac{1}{T^2}(t-\tau_{lm})^2\right)\![\exp(-i\beta_{lm}z)m_{lm}(r)]\qquad\text{Eq. 2}$$

where $\eta_{lm}$, $\tau_{lm}$, $\beta_{lm}$, and $m_{lm}(r)$ represents the amplitude, modal group delays, propagation constant and the normalized modal field distribution for the fiber under consideration with each mode labeled by the two indices as shown in the figure below.

The modal excitation spectrum $\eta_{lm}$ depends on a particular signal launch technique. In Eq. 2, the amplitudes $\eta_{lm}$ at the output can be the same as the input or may have changed due to mode-mixing along the propagation path in the fiber. In case of strong mode mixing, computed modal delays and excitation amplitudes can have little bearing on the measured modal delays and excitations since the data has traveled along multiple logical paths, each with corresponding signal delay. In reality, for a short distance transport, the following have been observed or assumed: (a) output modal excitation spectrum is related to the input modal excitation—this is why RML even works, (b) propagation tends to mix modes that have similar electric field profiles and very close propagation constants. These are more conveniently classified by principal mode number $v=2m+l$ where m is the radial index and l is the azimuthal index as shown FIG. 1 on the left, and (c) the lowest order modes are most susceptible to errors in the index profile in the very center of the fiber.

The last observation has been used to increase the EB of the fiber by a technique called offset mode launch. In this case, higher order modes are excited which are presumably not susceptible to the index defects in the center of the fiber since they have zero of the electric field in the center, as shown in FIG. 1. The same logic applies to the use of angled launch in the fiber which also excites higher order modes.

These modal fields can be used to estimate the excitation spectrum by evaluating the overlap integral of the modal fields with the input field. Furthermore, one can use various theories or experimental observed data of modal coupling to predict the output excitation spectrum from the input excitation spectrum.

Figure 2:
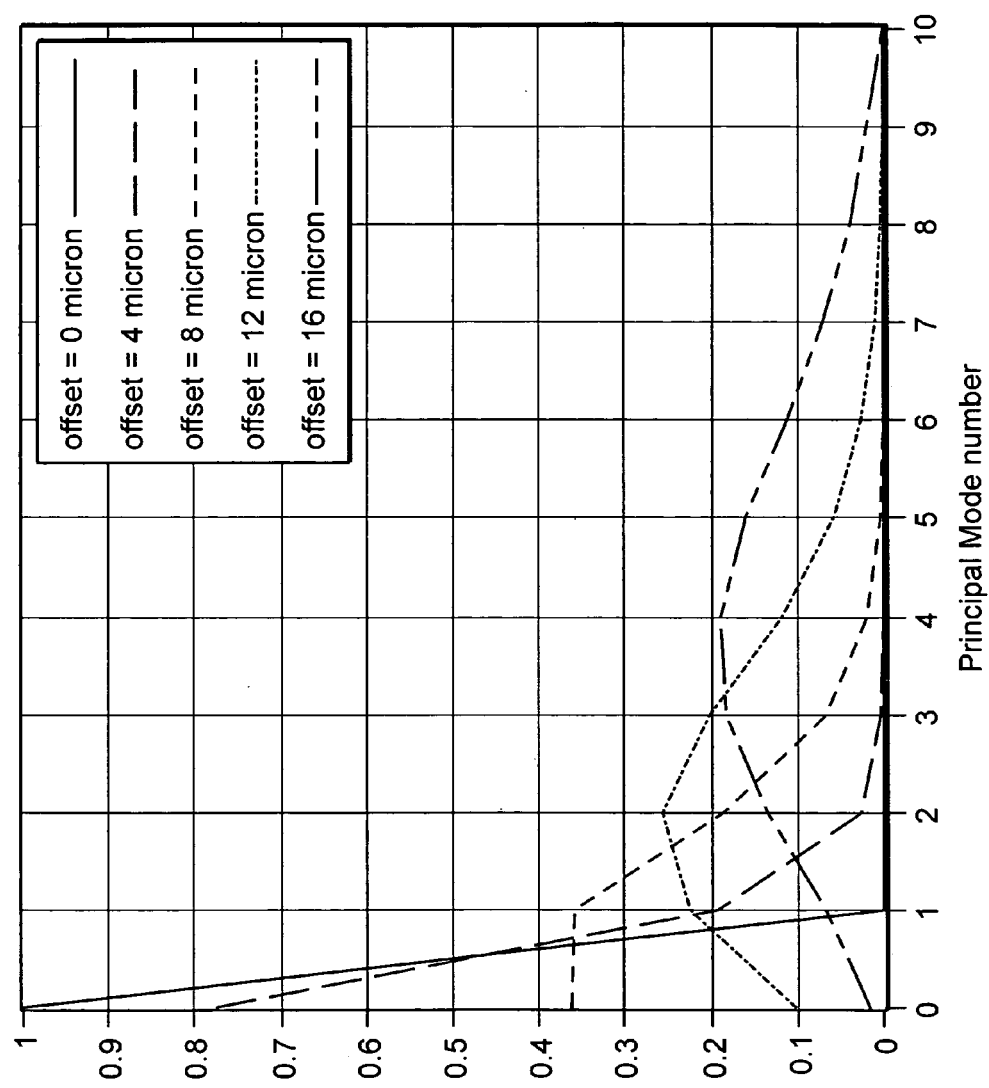
FIG. 2 is a graph demonstrating the calculated couplings to various principal mode number ν as a function of the offset from the center.

FIG. 2 shows the calculated couplings to various principal mode number v as a function of the offset from the center. Most experiments on MM transport have focused on using a receiver that collects all the light emerging from the fiber and measuring the electrical impulse response. Electrical impulse response is non-linear since the photo-detector is a square-law device. Thus, even though the underlying MM fiber as a transport system can be viewed as a complex linear filter, electrical response is not linear. This is because the electrical response can be defined as $$h_e(t) = \int_{detector} \langle |h(r, t)|^2\rangle_{dT} dr\qquad\text{Eq. 3}$$

where the integration is over the entire detector surface and the angled bracket corresponds to the temporal average taken over a period not much shorter than the impulse width T.

Of course, if the imaging system is used to collect the light emerging from the MM fiber than each of the modes in Equation 2 should be propagated thru the imaging system to the detector via appropriate means such as Fresnel integrals. The integration over the detector surface in Equation 3 would not lead to the cancellation of the cross terms due to (a) delays in different channels since temporal integration must be carried out first and (b) the mode fields are in general do not form orthogonal set of functions after propagation thru the imaging system on the detector.

It is this cross-terms in the electrical signal that are extremely difficult to separate and are dependent on both the relative phases and excitation spectrum of fiber modes. Thus, in many discussions of MM data transport, effort is made to reproduce observed impulse response function $h_e(t)$ by making additional assumptions on the characteristics of the data transport. Also, the cross-terms are sensitive to the relative optical phases and add excess noise to the measured electrical signal.

The invention removes or filters the unwanted and interfering modes created either along the propagation path from fiber imperfections or from modal excitation spectrum at launch be filtered before the photo-detector. This is achieved by inserting a mode filter that selects, in general, a linear combination of incoming modes. Thus, only the desired terms in the sum in Equation 2 are detected by the photo-detector. In case of single mode selection, all cross terms are eliminated and full bandwidth of an equivalent SM fiber can be accessed.

Figure 3:
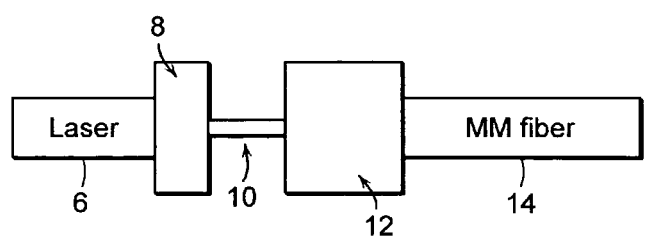
FIG. 3 is a schematic diagram illustrating the inventive technique of mode filtering.
Figure 3:
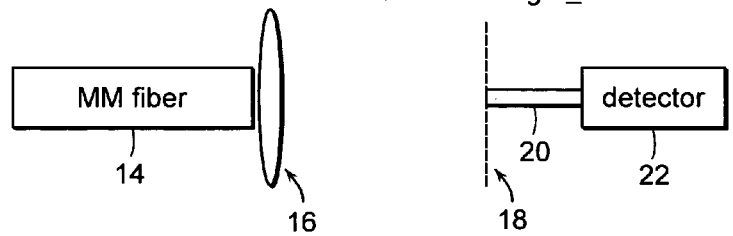

In one implementation of the mode filtering, the use of intermediate SM fiber is used a transmitter design. FIG. 3 illustrates that a transmitter-side mode filter 2 is similar to a receiver-side mode filter 4. The transmitter-side mode filter 2 includes a laser source, SM fiber coupler 8, a SM fiber 10 that couples a mode transformer 12 to the SM fiber coupler 10, and a MMI fiber 14. The receiver-side mode filter 4 includes a Fourier plane 18, a SM fiber 20, and a detector 22. A lens 16 can be used as a Fourier Transformer of the modal distributions of the MM fiber 14 in combination with a the SM fiber 10 as a complex mode selective filter. A SM VCSEL can be used as a laser source 6, the laser mode profile can be adequately described by a Gaussian and thus one can directly image the SM VCSEL mode to the fundamental mode of the MM fiber 14. For edge emitters, the output beam is elliptical and use of SM fiber 10 as the intermediate step simply eliminates astigmatism but obviously introduces extra coupling loss.

Figure 4:
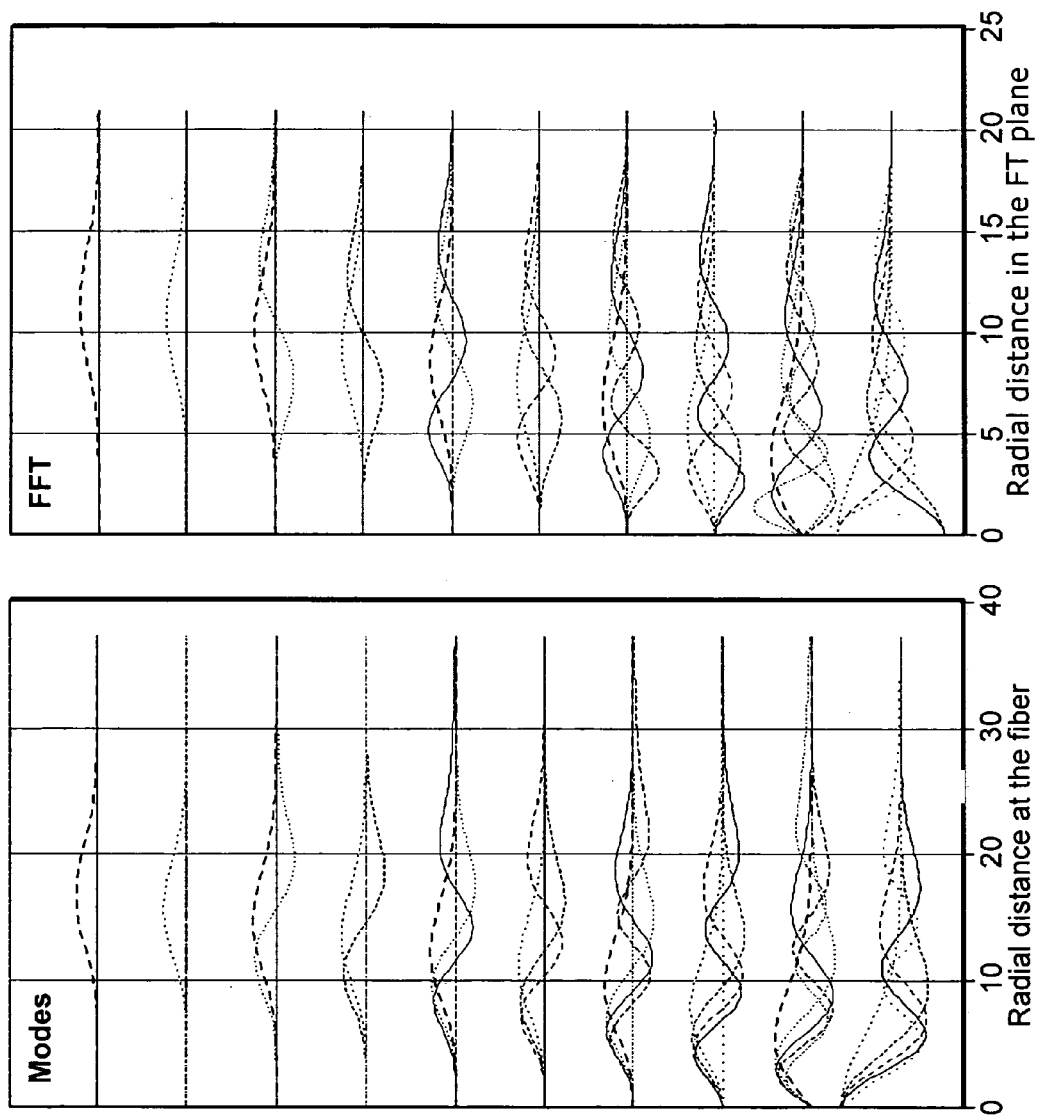
FIG. 4 is a graph demonstrating the excitation and detection of the fundamental modes a fiber.

One can illustrate the above concept with the $LP_{01}$ mode or the fundamental mode for simplicity but the concept is not limited to exciting and detecting only the fundamental modes, as shown in FIG. 4. It is easy to primarily excite the fundamental mode. This excited fundamental mode alone is selected at the receiver end for detection, thus eliminating signal propagation delays generated by other "unwanted" modes. A conventional spatial filter such as a pinhole followed by a detector may be adequate in some cases but in general will not perform as well as a SM waveguide—be it a fiber or an integrated optical device. The receiver optics are designed in conjunction with the transmitter optics. The lens and the SM waveguide (shown in FIG. 4 as a SM fiber) placed in the Fourier plane of the lens acts as an optical mode filter. By carefully choosing the focal length of the lens, the fundamental mode of the MM fiber is matched to the SM fiber placed in the Fourier plane.

One can show that the field distribution from the higher order modes are coupled poorly, as shown in FIG. 4, to the SM fiber 20. This can be shown by computing the overlap integral between the fundamental mode of the SM waveguide (fiber 20) and the modal electric field patterns from each of the incoming modes of the MM fiber after the imaging system at the input of the SM WG. This computation shows that by choosing the imaging system (e.g., lens 16) only the fundamental mode of the MM fiber can produce substantial excitation in the SM waveguide or the fiber 20.

Furthermore, even if there is a coupling to higher order modes or to "leaky" modes of the SM fiber/waveguide 20, these can be further attenuated before reaching the detector by using bends or using waveguides with tight curves before reaching the detector.

FIG. 4 shows the field patterns in the transform plane. One needs to only show the field along the radial coordinate since the angular dependence is of the form $e^{il\theta}$. Note how subsequent (l, m) modes are spatially separated and form regions of concentric circles. It turns out that the principal mode number ν represents the combination of (l, m) modes that form regions increasing radii in the Fourier plane. For a quadratic index fiber, this in turn means that these regions also correspond to almost monotonically decreasing group delay with respect to the $LP_{01}$ mode. This is because the group delays and propagation constants are same for the same ν in the standard WKB-type approximation. Thus, a concentric segmented detector will perform as a MDM detector for multiple signals encoded in orthogonal modes. This result can be generalized and as shown below, an appropriate mode filter combined with a set of detectors can be used to separate different data streams in different group of modes.

In practice, the entire assembly can be realized using V-grooves in which the MM optical fiber, Graded-index lens, and the SM fiber are aligned. Additionally, one can use integrated SM waveguide couplers to the detector to further simplify the design of the MM receiver. Similar solutions can be used with an edge-emitting laser on the transmitter side to excite lowest order mode or perform an offset launch.

The invention allows other optical components to be used to excite a set of higher modes. Accordingly, the concepts herein are not limited to Gaussian like modes of the fiber. For example, a conical refractive element will turn incoming Gaussian beam from the laser into a ring like electric field distribution which in turn excites higher order mode set. A similar element in reverse can be used at the receiver. As another example, $LP_{11}$ mode can be primarily be excited by a beam splitter and a combiner assembly or a beam splitting phase grating.

Figure 5:
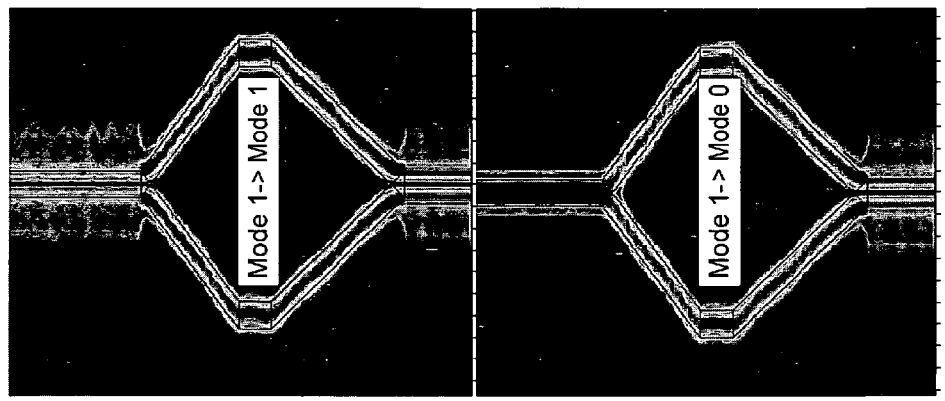
FIG. 5 is graph demonstrating "0" and "π" states of the MZI exciting the fundamental and second mode of an output waveguide.
Figure 5:
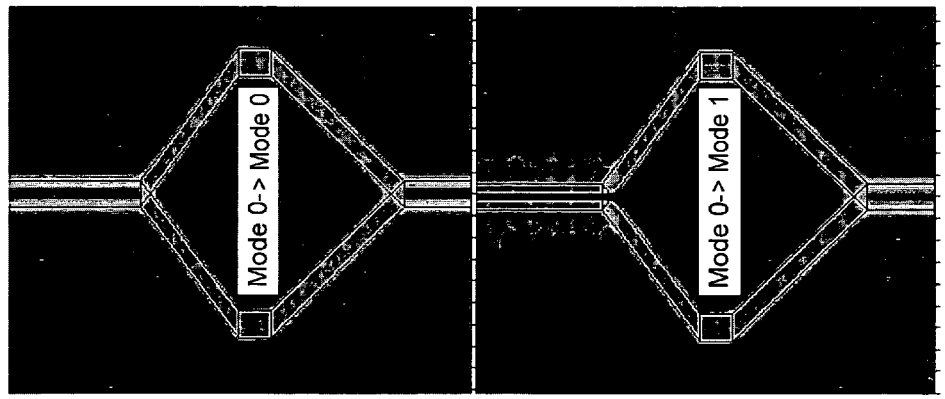

Clearly waveguides with Mach-Zhender interferometer (MZI) type geometry can be used to excite higher order modes. For example, if the output waveguide from the MZI supports two modes, than the "0" and "π" states of the MZI will excite the fundamental and second mode of the output waveguide respectively as seen in FIG. 5.

Figure 6:
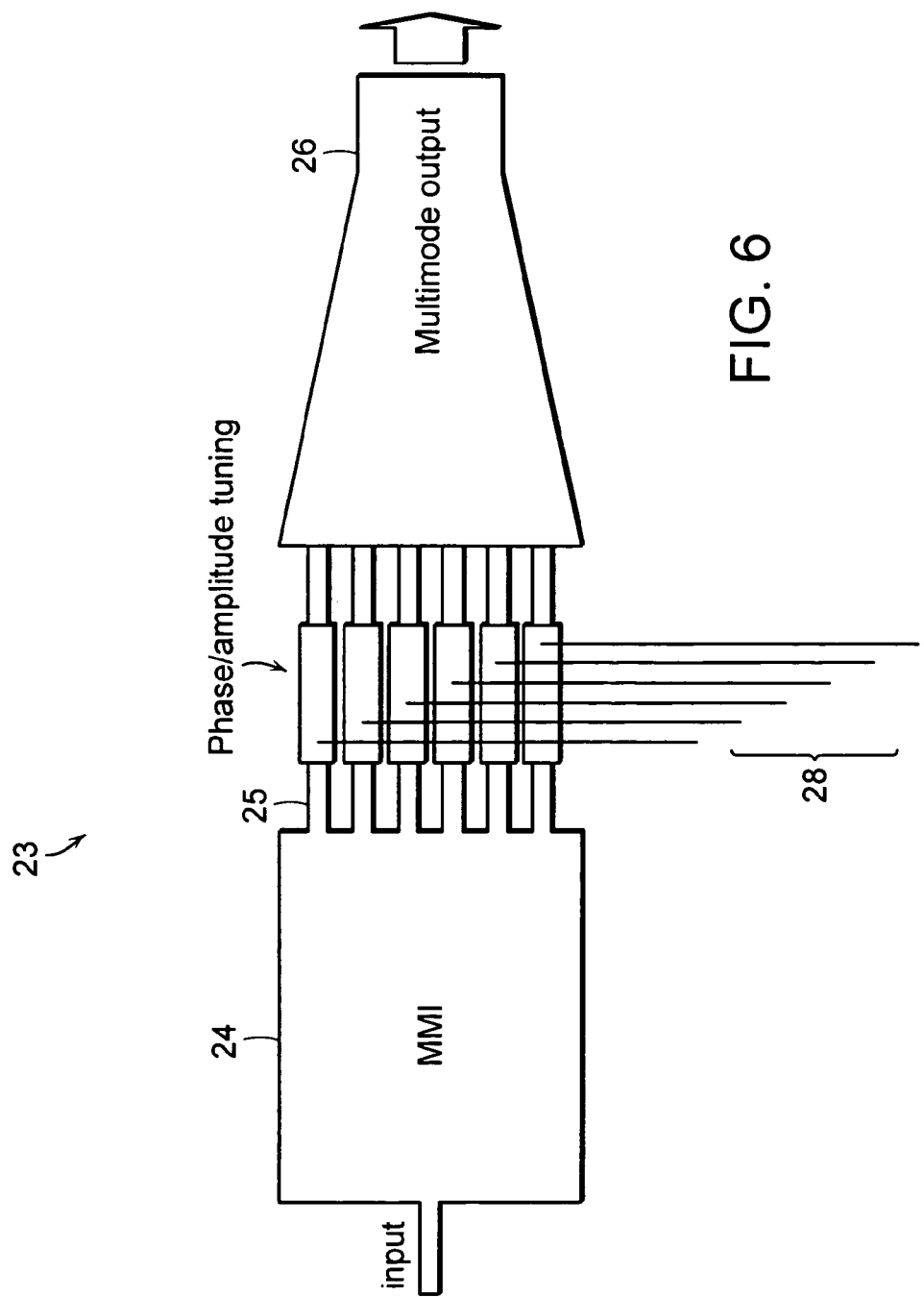
FIG. 6 is a schematic diagram illustrating a multimode coupler structure.

As one can see, this can be generalized to multiple modes by using a multi-mode interference coupler (MMI) 23. The output of MMI 24 is coupled into a set of waveguides 25. The phase and the amplitude of the light passing thru each individual waveguide is then modulated by control signals 28 to excite predominantly a particular mode of an output waveguide at a multimode output 26, as shown in FIG. 6. The phase and amplitude control may be achieved using well-known waveguide based modulator techniques such as MZI or ring resonators.

Each of these elements are reversible in the sense that they can be used at the receiver end to convert the higher order mode back into a Gaussian like mode that can be filtered using SM waveguides/fibers. Thus, waveguides can provide tremendous flexibility in sorting modes and providing complex linear mode filtering elements. It can be easily shown that Multi-mode interference based coupler is a simplest version of a flexible mode filter. It is also important to note that the concepts described herein apply to any multimode waveguides used for transport of signals. One can imagine using multimode waveguides of rectangular cross-sections "printed" on a substrate for board to board or chip to chip communication. These waveguides may have mode field diameters compatible with planar waveguides on a photonic chip such that multiple channels of MDM based communications are created by exciting linear combination of orthogonal modes in the transport printed waveguides. These can be filtered at the receiving end using the on-chip waveguides to decipher the signal channels. This can provide the lowest cost method for high density communication.

It will be appreciated that this allows one to perform some very interesting optical switching. In order to switch the communication channel from mode $m_1$ to $m_2$, a "programmable mode converter" needs to be created. As discussed regarding the MZI, MMI, and many other common components can now be viewed as programmable mode converters. Thus, MDM based communication system can switch without requiring the use of wavelength converters (replaced by mode converters) and highly stable resonant structures to separate wavelengths since most mode converters can be based on spatial interference with equal optical paths. It may also reduce the requirement on the wavelength stability of the laser source making low-cost multichannel, high speed communication possible.

Figure 7:
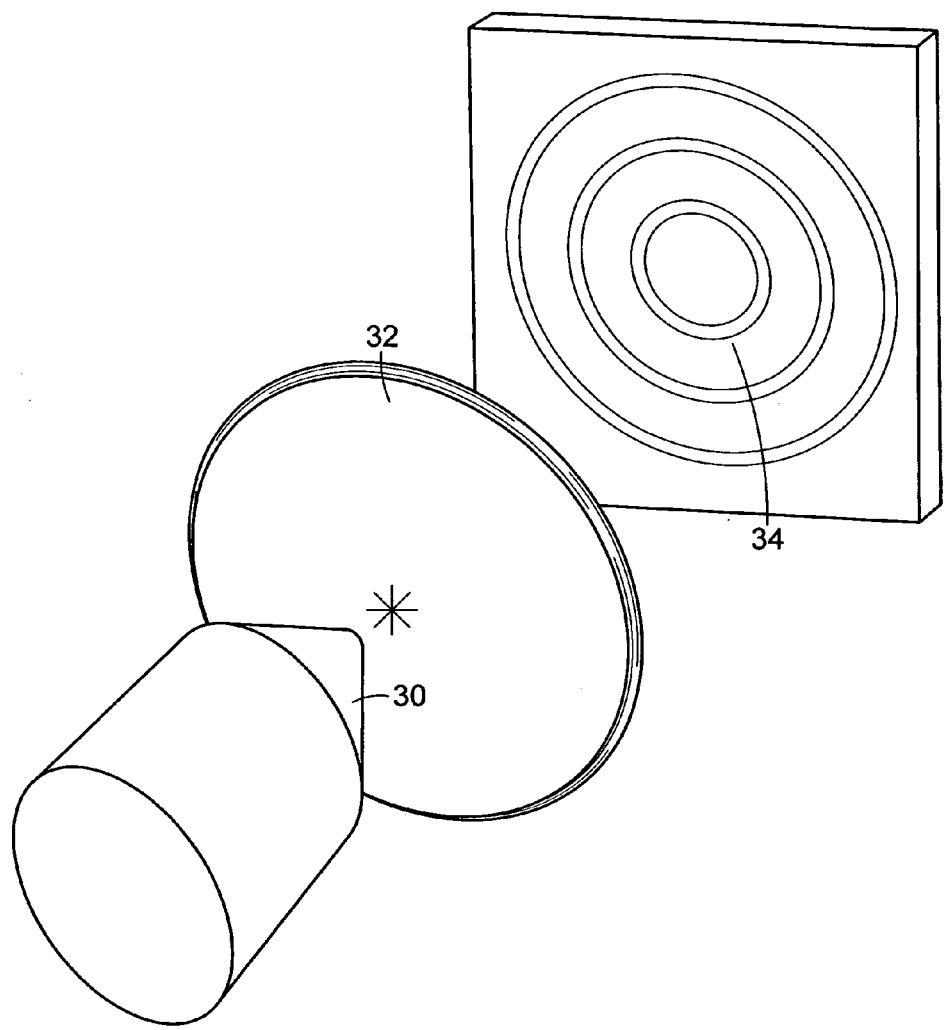
FIG. 7 is a schematic diagram illustrating an alternative embodiment of the inventive technique of mode filtering.

In another embodiment of the invention, the end of the multimode fiber 30 may be tapered. As the radius is gradually decreased, modes starting with the highest ν, will be radiated away in such a way that the effect of lens 32 will be to separate them in the imaging plane formed at the detector 34. Each of the mode groups can be separated and made incident on a concentric detector array 34 as shown in FIG. 7.

Figure 8:
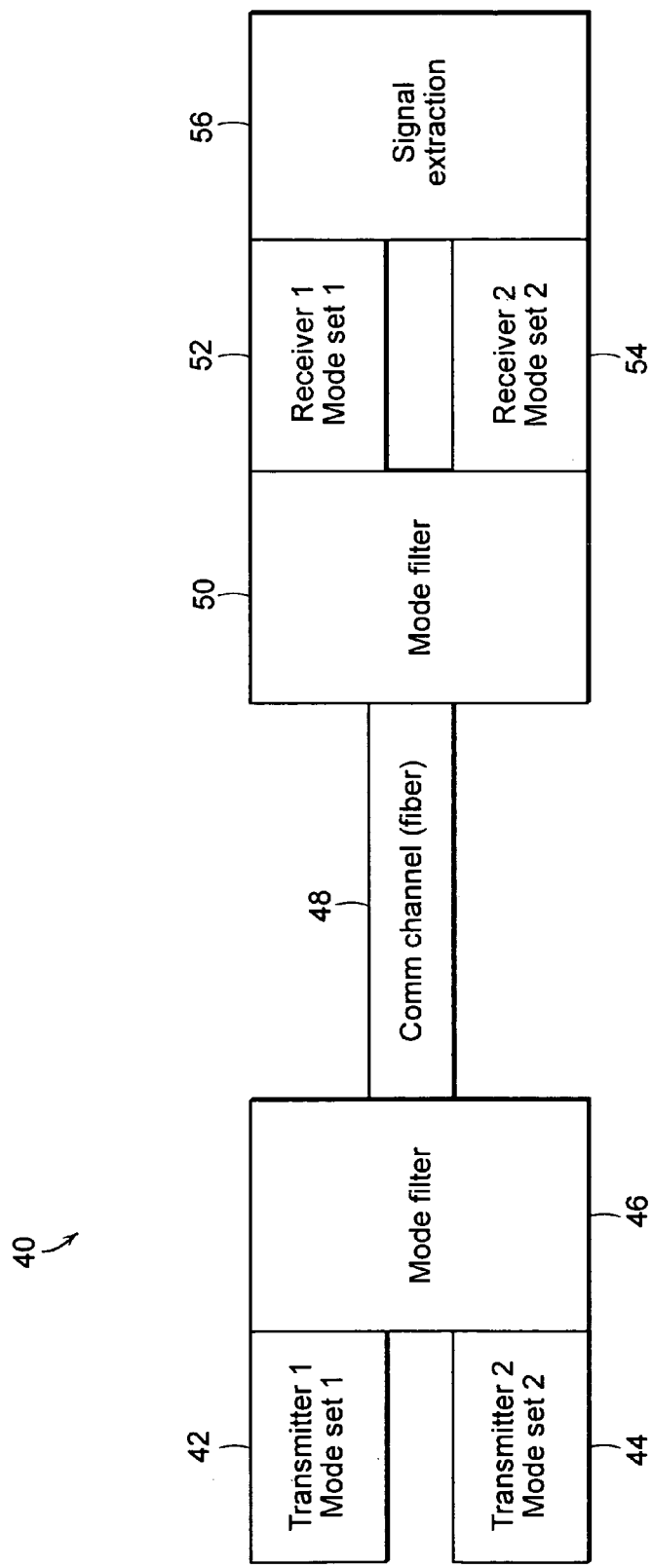
FIG. 8 is a schematic block diagram illustrating a mode division communication system.

FIG. 8 is a schematic block diagram illustrating a mode division communication system 40. The mode division communication system 40 is primarily used to provide optical communication in a defined mode range, which is tolerable for use in a convention optical communication. In this case, the mode division communication system 40 includes two transmitters 42, 44 that transmit having two separate set of modes defined as mode set 1 and mode set 2.

The transmitters 42, 44 provide their output signals to a mode filter 46 that selects the appropriate modes that are permitted to go thru a channel communication fiber 48. In this case, mode filter 46 is used as a combiner of the two mode sets. The channel communication fiber 48 is then used to transmit both sets of modes. In this case, the same physical channel—fiber 48—is used to transmit information from both channels in which the transmitters 42 and 44 may or may not have the same transmission wavelength.

The second mode filter 50 selects the appropriate modes and sends them to receivers 52 or 54 will process. Note that the receivers 52, 54 will receive different information channels owing to the fact that mode filter 50 passed on appropriate sets of modes corresponding to the transmitters 42 and 44. Thus, receivers 52 and 54 process different sets of modes as defined by mode set 1 or 2. Note these are the same mode sets for transmitters 42, 44. The output signals from the receivers 52, 54 are forwarded to a signal extraction device 56 for converting optical signals into appropriate electrical signal equivalents. The method shown here can be generalized to more than two sets of transmitters and receivers.

Figure 9:
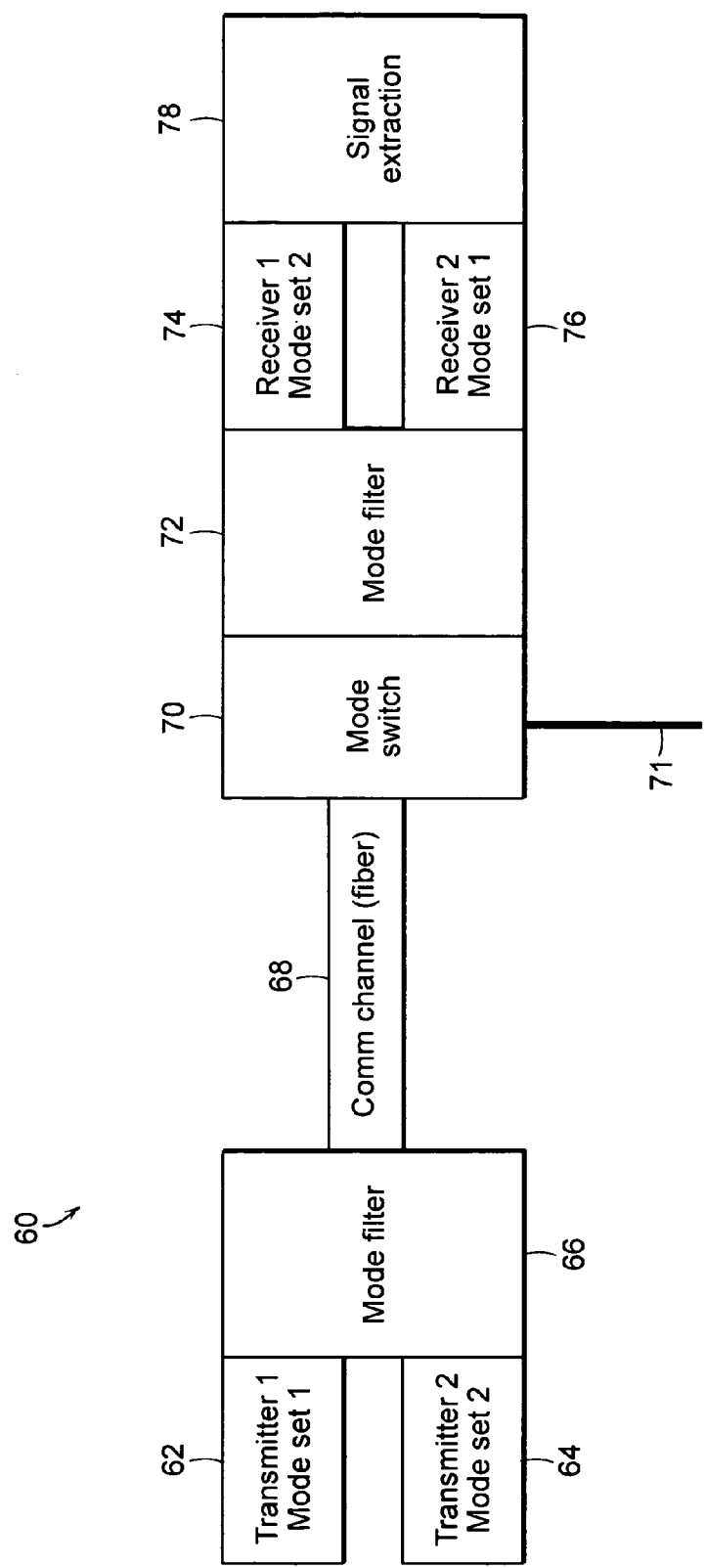
FIG. 9 is a schematic block diagram illustrating a mode switching system.

FIG. 9 is a schematic block diagram illustrating a mode switching system 60. This is similar to FIG. 8. The mode switching system 60 is primarily used to provide optical switching in a defined mode range, which is tolerable for use in a convention optical communication. In this case, the mode switching system 60 includes two transmitters 62, 64 that transmit having two separate set of modes defined as mode set 1 and mode set 2. The transmitters 62, 64 provide their output signals to a mode filter 66 that selects the appropriate modes that are permitted to go thru a channel communication fiber 68. Again, mode filter 66 is used as a combiner of the two mode sets. The channel communication fiber 68 is then used to transmit both sets of modes. Now in order to switch the outputs of Receivers 74 and 76, an extra element 70 is inserted between fiber 68 and mode filter 72. The operation of elements 72, 74, 76, and 78 is similar to elements 50, 52, 54, and 56 respectively. The difference is that depending on the control signal 71 provided to the mode switch, the switch 70 interchanges the mode sets associated with the data channels 1 and 2. This is accomplished by means such as MZI shown in FIG. 5.

The purpose of such a mode switch would be efficiently switch data paths. High-speed optical date paths may be switched by employing an electrical switching system. Incoming optical data is converted to electrical signals, which are then switched, and the output converted back to optical signals. In the past, various proposals for switching high-speed data without optical to electrical and electrical to optical conversions have been proposed. The motivation for avoiding electrical conversions include reduction in power, size, cost, and complexity. Previously proposed optical switching methods include moving mirrors, wavelength translators, electro-optic or thermo-optic modulation of coupled waveguides of various types. In the present invention, the modes are switched. Thus, the advantage of using a single compact input and output channel for communication is—that wavelength division multiplexed systems have—without the burden of using precision wavelength stabilized lasers and complex wavelength translators using nonlinear optics. Instead, one can use well-understood methods of coupled waveguide design and electro-optic or thermo-optic or some other optical effect to switch the modes associated with data channels.

The invention is not limited to use of conventional fibers but is applicable any waveguides that support multiple modes. This may be plastic or glass waveguides that form the "backplane" for data. This may be on-chip for transport data from one part of the chip to another location. One can use the term fiber to denote all such class of waveguide channels.

Although the present invention has been shown and described with respect to several preferred embodiments thereof, various changes, omissions and additions to the form and detail thereof, may be made therein, without departing from the spirit and scope of the invention.

What is claimed is:

1. An optical communication system comprising:
    a transmitter that receives an input optical signal from an optical source through a fiber and performs mode selection so that an output signal from said transmitter includes a specific set of fiber modes that are allowed to pass for further processing through a multimode fiber;
    a receiver that receives said output signal from said multimode fiber and performs the necessary operations to retrieve a signal indicative of said input signal, said receiver uses a tapered multimode fiber to perform the filtering of said input signal; and
    a mode transformer that couples said fiber and said multimode fiber.

2. The optical communication system of claim 1 further comprising a fiber coupler that couples said optical source and a fiber.

3. The optical communication system of claim 1, wherein said transmitter uses a lens structure to perform the filtering of said input signal.

4. The optical communication system of claim 3, wherein said lens performs the mode selecting of said input signal by way of said multimode fiber.

5. The optical communication system of claim 1, wherein said receiver comprises a Fourier plane.

6. The optical communication system of claim 1 further comprising a second fiber structures that couples said Fourier plane and a detector.

7. A method of configuring an optical communication system comprising:
    providing a transmitter that receives an input optical signal from an optical source through a fiber and performs mode selecting so that an output signal from said transmitter includes a specific set of fiber modes that are allowed to pass for further processing through a multimode fiber;
    providing a receiver that receives said output signal from a multimode fiber and performs the necessary operations to retrieve a signal indicative of said input signal said receiver uses a tapered multimode fiber to perform the filtering of said input signal; and
    providing a mode transformer that couples said fiber and said multimode fiber.

8. The method of claim 7 further comprising providing a fiber coupler that couples said optical source and a fiber.

9. The method of claim 7, wherein said receiver uses a lens structure to perform the mode selecting of said input signal.

10. The method of claim 9, wherein said lens performs the filtering of said input signal by way of said multimode fiber.

11. The method of claim 7, wherein said receiver unit comprises a Fourier plane.

12. The method of claim 11 further comprises providing a second fiber structure that couples said Fourier plane and a detector.

* * * * *